Feb. 12, 1924.
J. J. REYNOLDS
SHOCK ABSORBER
Filed May 11, 1921
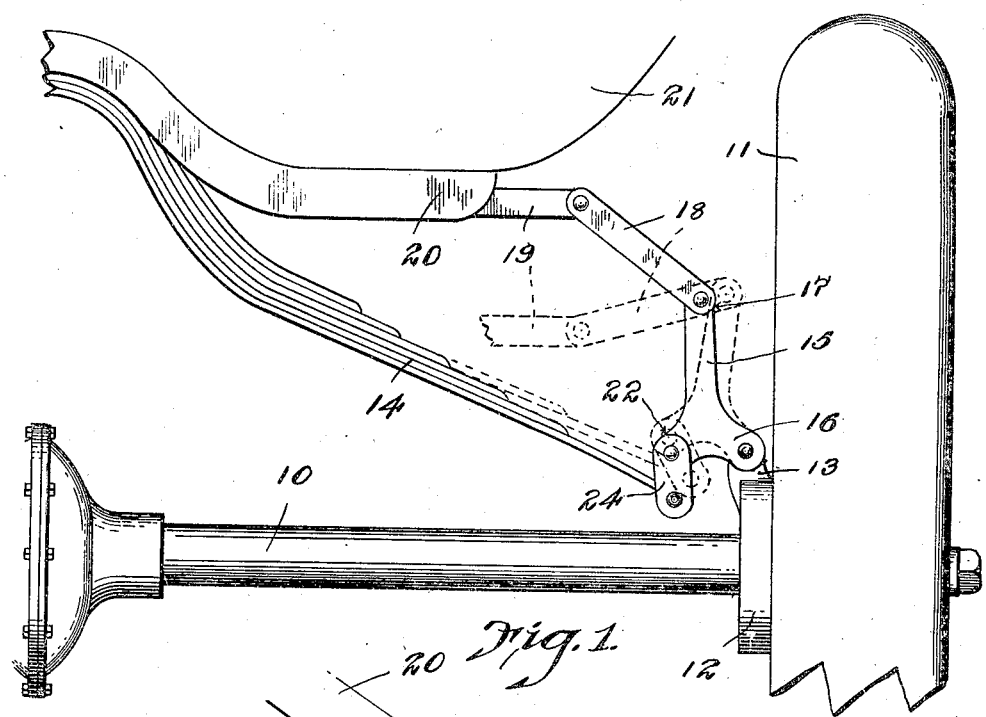
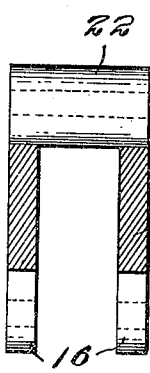
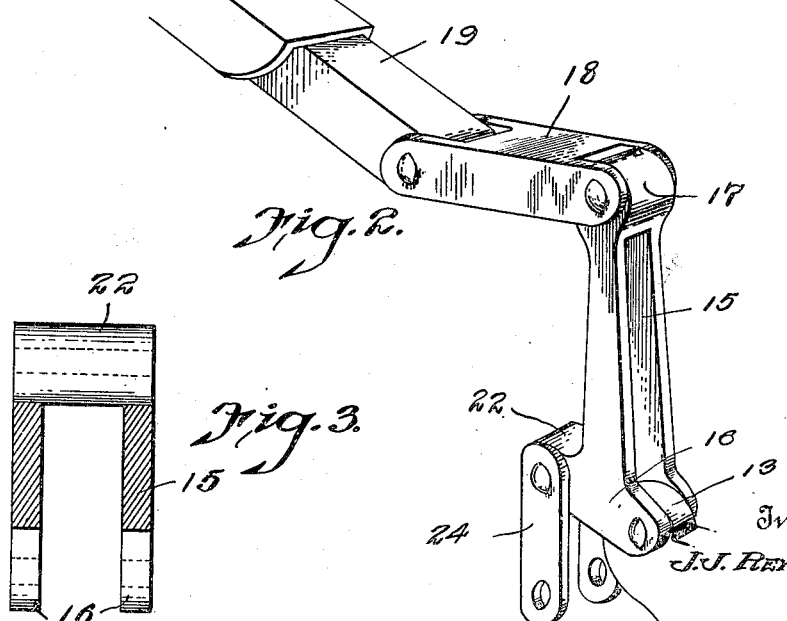
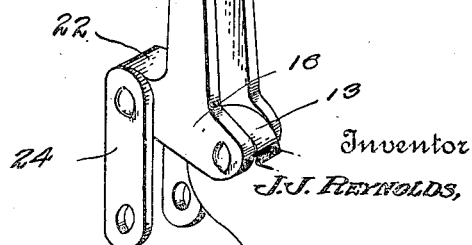

Patented Feb. 12, 1924.

1,483,481

UNITED STATES PATENT OFFICE.

JOHN J. REYNOLDS, OF GIFFORD, ILLINOIS.

SHOCK ABSORBER.

Application filed May 11, 1921. Serial No. 468,522.

*To all whom it may concern:*

Be it known that I, JOHN J. REYNOLDS, a citizen of the United States, residing at Gifford, in the county of Champaign and State of Illinois, have invented certain new and useful Improvements in Shock Absorbers, of which the following is a specification.

This invention relates to vehicle spring mountings, and particularly to shock absorbing devices associated therewith, and aims to give a simple mounting for springs of a familiar type now generally used, which shall include mechanism whereby shocks communicated to the axle of the vehicle will be minimized before transmission to the springs, without requiring the interposition of other resilient elements such as dashpots, springs, or snubbing devices. A further important aim of the invention is to provide a device which will safeguard springs largely against liability of fracture under excessive flexure. The invention resides in the specific construction, arrangement, and combination of parts hereinafter described, in which additional advantages may be apparent as well as further objects. In the drawing forming a part of the specification, there is shown in—

Figure 1 is a framentary elevation of a rear axle frame and body of a motor vehicle, upon which my invention is incorporated.

Fig. 2 is a detail perspective view of the spring mounting and connections.

Fig. 3 is a cross section of the link 15.

There is illustrated a rear axle housing 10 of ordinary form, outwardly of which there is a wheel 11 and tire of ordinary construction, the rear axle housing including a terminal circular plate 12 on which there is formed a perch 13, which extends upward a short distance. A spring 14 is also shown of a familiar form mounted in a shackle of usual form, swung from the lever 15.

Mounted upon the perch 13, there is a T-shaped lever 15, the long arm of which extends vertically upward, initially. At the lower end two outwardly extending ears 16 are provided to receive the perch 13 therebetween to which they are pivotally connected. At its upper end, the lever 15 is formed with a solid apertured head 17 to which there is pivotally connected a link 18 pivotally mounted upon a bar 19, secured rigidly upon the end piece 20 of the frame of the motor vehicle, a body 21 of which is shown in part. The link 18 is bifurcated at both ends to receive the respective members therein to which it is connected. At the lower inner end of the lever 15 opposite the ears 16, there is formed a lug 22 of dimensions similar to those of the perch 13, so that the spring shackle 24 may be readily hung upon the lug 22 in the same manner as ordinarily pivoted upon the regular perch. The spring 14 is connected to the lower part of the shackle in the ordinary manner, and it will be seen that the body 21 is free to move vertically with relation to the axle 10, the while being supported by the spring 14.

The length of the upper arm of the lever 15 and the link 18 have a definite relation to the strength of the spring and the distance between the perch 13 and the medial longitudinal axis of the vehicle. Thus, the lever 15 should be of a length to lie with its upper end nearly on a level with the member 20 of the frame when the vehicle is loaded, and the link 18 should be of a length to permit proper vertical movement of the body with respect to the axle, without obstruction.

With the parts assembled as described and shown in Fig. 1 when the vehicle is in motion and encounters inequalities in the road surface, when the axle is thrust upwardly abruptly, the inertia of the body 21 will force the link 18 to be drawn downwardly and outwardly until the member 19 passes the level of the head 17, and thereafter the link will draw the lever inwardly, thus elevating and lowering the lug 22 of the lever 15 and lessening the shock finally communicated to the spring and through the spring to the body 21. It will be noted that after the bar 19 passes below the head 17 the power exerted by the spring on the lever 15 will tend to bear down on the member 19 thereby giving the effect of a lengthening spring.

Also, in case of a severe "throw" by the spring, by which is meant recovery from severe compression with such effect that the body 21 will pass above its normal height above the axle, the link 18 will again draw the lever 15 inwardly, as the body moves upwardly beyond a certain maximum, lowering the ends of the springs and lessening pressure thereof upon the body of the lever, so that the throwing effect will be correspondingly lessened.

It will be readily apparent that the device is of simple construction and readily mounted without involving much departure in design from the usual construction of such machines as that illustrated in the drawings and is also calculated to withstand wear and tear efficiently.

What is claimed:

In a device of the character described, an axle element, a body, a spring mounted upon the body, and having a flexing outer part, a lever having a lower portion mounted upon the axle and having a long arm extended upwardly therefrom a distance so that the lever will have its principal movement in a horizontal direction, a link pivotally connected to the upper end of the lever and pivotally connected to the body, and extending diagonally to the lever, said lever having a lateral extension at its lower part, said spring being hung from said extension for the purposes described.

In testimony whereof I have affixed my signature in presence of two witnesses.

JOHN J. REYNOLDS.

Witnesses:
C. L. REYNOLDS,
E. B. WOOLDRIDGE.